United States Patent [19]

Ganiaris

[11] 3,793,740
[45] Feb. 26, 1974

[54] FLUIDIZED BED PROCESS
[75] Inventor: Neophytos Ganiaris, Riverdale, N.Y.
[73] Assignee: Struthers Scientific and International Corporation, New York, N.Y.
[22] Filed: June 6, 1972
[21] Appl. No.: 260,147

[30] Foreign Application Priority Data
June 18, 1971 Great Britain.................. 28,756/71

[52] U.S. Cl................................ 34/10, 159/DIG. 3
[51] Int. Cl........................ F26b 17/10, F26b 3/08
[58] Field of Search. 159/4 A, 4 CC, 4 VM, DIG. 3; 34/10, 57 R, 57 A, 57 D

[56] References Cited
UNITED STATES PATENTS
3,255,036  6/1966  Kramer et al................. 159/DIG. 3
3,289,732  12/1966  Kotelnikov et al............ 159/DIG. 3
3,112,220  12/1963  Heiser, Jr. et al............ 159/DIG. 3

Primary Examiner—Meyer Perlin
Assistant Examiner—William C. Anderson

[57] ABSTRACT

A fluidized bed process for the drying and granulation of a 50 per cent by weight aqueous solution of ammonium sulphate is carried out in a container having a conical bottom portion in which a gas is introduced, the conical bottom portion reducing the velocity of gas flowing upward therein from about 7 to 10 to about 4 to 6 feet per second to control the generation of dust.

1 Claim, 1 Drawing Figure

PATENTED FEB 26 1974 3,793,740
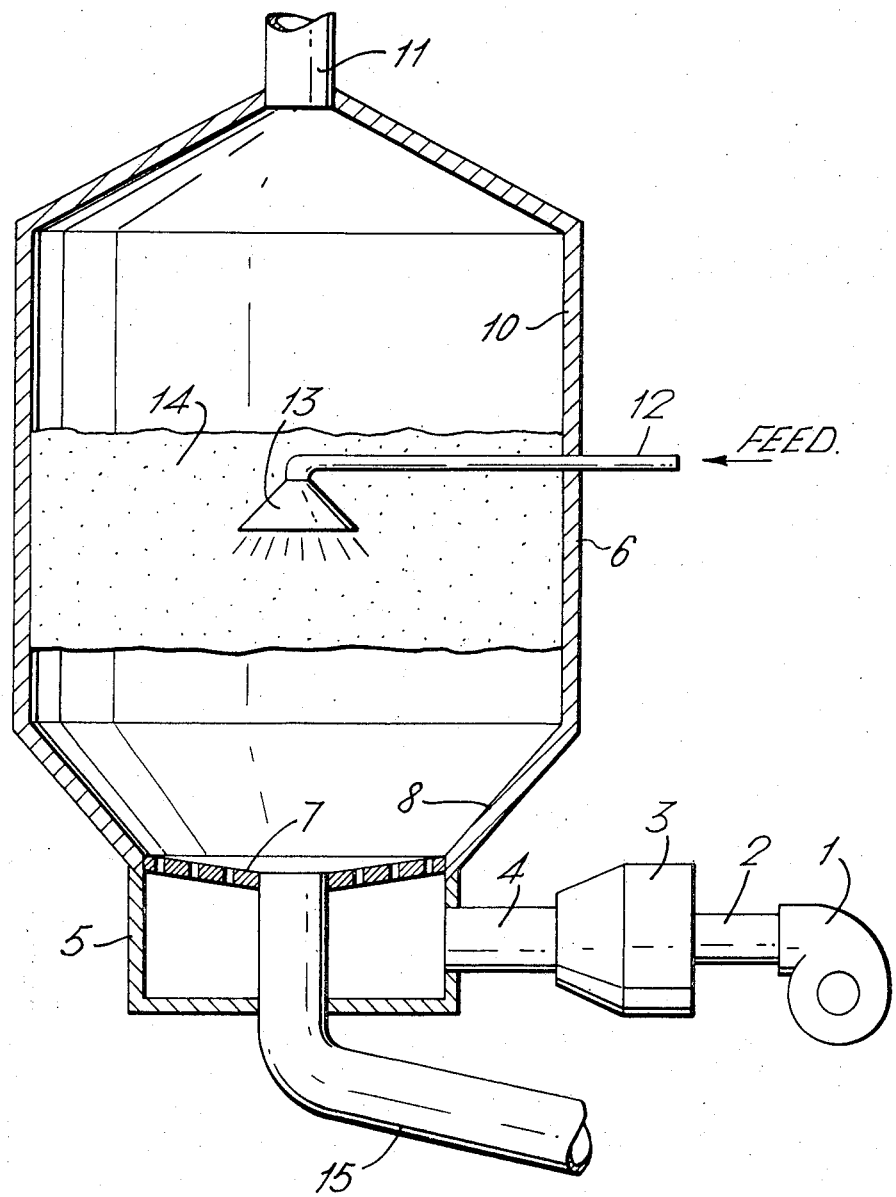

FLUIDIZED BED PROCESS

BRIEF DESCRIPTION OF THE DRAWING

The FIGURE of the Drawing is a vertical section through a chamber in which a fluidized bed process is carried out according to this invention.

DESCRIPTION OF THE PREFERRED EMBODIMENT

Blower 1 forces air through duct 2 through combustion chamber 3 to deliver heated air through duct 4 into the bottom 5 of chamber 6. A perforated plate 7 or the like divides chamber 6 from bottom 5. The lower portion of chamber 6 has a conical configuration 8 which substantially doubles the cross sectional area of chamber 6 from plate 7 to the upper cylindrical portion 10 of chamber 6. Gas passes from the upper end of chamber 6 through duct 11.

If operated as a fluidized bed dryer, feed is introduced through pipe 12 to a spray head 13 into a fluidized bed 14 formed in container 6. If the feed liquid is about 50 per cent solids, the feed will coat fluidized particles and dry thereon to build larger granules which will fall downward and be withdrawn as a product through tube 15.

If the upward average velocity of gas directly about plate 7 is about 10 feet per second, the upward average velocity of gas in the cylindrical portion 10 of chamber 6 will be from 4 to 6 per second. This lower gas velocity in bed 14 reduces the generation of dust or fines which are carried upward to pass out duct 11. While the fluidized bed 14 is generally disposed above cone 8 in the cylindrical portion 10, any settling of the bed is stabilized as the bed 14 will not settle into the higher velocity upward gas flow in cone 8.

This invention may be used to provide aggregated or granulated particles of ammonium sulphate, ferrous sulphate, or ammonium phosphate.

What is claimed is:

1. The process of providing product granules from an aqueous feed solution of substantially 50 per cent by weight of ammonium sulphate comprising the steps of
   a. passing heated air upward in a fluidized bed dryer having a cylindrical body in which air moves upward at a rate of 4 to 6 feet per second and an inward tapering conical lower end in which air moves upward at a rate of 7 to 10 feet per second,
   b. spraying the aqueous solution of feed into the cylindrical body forming a fluidized bed therein in which drying particles aggregate forming product granules which fall from the fluidized bed, the fluidized bed being stabilized above the faster flowing air in the conical lower end of the dryer, the slower fluidizing air in the cylindrical body reducing dust generation, and
   c. removing product granules from the bottom of the dryer.

* * * * *